(12) United States Patent
Gresset et al.

(10) Patent No.: US 10,397,922 B2
(45) Date of Patent: Aug. 27, 2019

(54) METHOD FOR ALLOCATING TIME-FREQUENCY RESOURCES FOR THE TRANSMISSION OF DATA PACKETS VIA A FREQUENCY SELECTIVE CHANNEL

(71) Applicant: MITSUBISHI ELECTRIC CORPORATION, Tokyo (JP)

(72) Inventors: Nicolas Gresset, Rennes (FR); Herve Bonneville, Rennes (FR)

(73) Assignee: MITSUBISHI ELECTRIC CORPORATION, Tokyo (JP)

( * ) Notice: Subject to any disclaimer, the term of this patent is extended or adjusted under 35 U.S.C. 154(b) by 0 days.

(21) Appl. No.: 15/562,394

(22) PCT Filed: Apr. 28, 2016

(86) PCT No.: PCT/JP2016/063938
§ 371 (c)(1),
(2) Date: Sep. 27, 2017

(87) PCT Pub. No.: WO2016/178435
PCT Pub. Date: Nov. 10, 2016

(65) Prior Publication Data
US 2018/0288766 A1 Oct. 4, 2018

(30) Foreign Application Priority Data
May 5, 2015 (EP) .................................... 15166456

(51) Int. Cl.
*H04W 72/04* (2009.01)
*H04W 72/12* (2009.01)
(Continued)

(52) U.S. Cl.
CPC ....... *H04W 72/0453* (2013.01); *H04L 47/245* (2013.01); *H04W 28/0236* (2013.01);
(Continued)

(58) Field of Classification Search
CPC combination set(s) only.
See application file for complete search history.

(56) References Cited

U.S. PATENT DOCUMENTS

| 6,799,208 | B1 * | 9/2004 | Sankaranarayan | ....... G06F 9/50 709/223 |
| 7,284,244 | B1 * | 10/2007 | Sankaranarayan | ... G06F 9/5027 718/103 |
| 7,844,972 | B2 * | 11/2010 | Raja | ...................... G06F 9/5027 709/223 |
| 2005/0030971 | A1 * | 2/2005 | Yuan | ...................... H04N 19/42 370/462 |
| 2007/0201404 | A1 * | 8/2007 | Cheon | ..................... H04L 47/10 370/331 |

(Continued)

FOREIGN PATENT DOCUMENTS

| EP | 2 063 580 A1 | 5/2009 |
| WO | 2009/130218 A1 | 10/2009 |

OTHER PUBLICATIONS

Lee et al., "Rotating Priority Queue based Scheduling Algorithm for IEEE 802.11n WLAN", Feb. 12-14, 2007 ICACT2007, pp. 1702-1706.

*Primary Examiner* — Yee F Lam
(74) *Attorney, Agent, or Firm* — Birch, Stewart, Kolasch & Birch, LLP

(57) ABSTRACT

A scheduler allocates time-frequency resources of a predefined time period for transmitting latency-constrained and non latency-constrained data packets over a frequency selective channel. The scheduler: performs assignment of time-frequency resources for transmitting non latency-constrained data; then, possibly performs a revision of the assignment so that time-frequency resources are allocated to latency-constrained data packets instead of non latency-constrained data packets, said revision being performed by minimizing cost impact of the revision on a global perfor- (Continued)

mance metric related to the transmissions of said non latency-constrained data packets; and, allocates the time-frequency resources as assigned to the non latency-constrained data packets that did not incur the assignment revision, whereas the latency-constrained data packets that incurred the assignment revision are put aside for later scheduling.

13 Claims, 5 Drawing Sheets

(51) Int. Cl.
*H04W 72/08* (2009.01)
*H04W 28/02* (2009.01)
*H04L 12/851* (2013.01)

(52) U.S. Cl.
CPC ..... *H04W 72/085* (2013.01); *H04W 72/1242* (2013.01); *H04W 72/1226* (2013.01)

(56) References Cited

U.S. PATENT DOCUMENTS

| | | | |
|---|---|---|---|
| 2009/0003202 A1* | 1/2009 | Polk | H04L 47/10 370/229 |
| 2010/0278121 A1* | 11/2010 | Chun | H04L 1/1887 370/329 |
| 2012/0221706 A1* | 8/2012 | Westberg | H04L 47/801 709/223 |
| 2013/0148624 A1* | 6/2013 | Gil | H04W 72/04 370/329 |
| 2014/0321476 A1 | 10/2014 | Yu et al. | |
| 2015/0007189 A1* | 1/2015 | De Gruijl | G06F 9/5011 718/104 |

\* cited by examiner

METHOD FOR ALLOCATING TIME-FREQUENCY RESOURCES FOR THE TRANSMISSION OF DATA PACKETS VIA A FREQUENCY SELECTIVE CHANNEL

TECHNICAL FIELD

The present invention generally relates to allocating time-frequency resources for data transmissions over a frequency selective fading channel between devices of a communications network.

BACKGROUND ART

In a communications network, the transmission of some data packets require meeting some transmission latency constraints, whereas the effective transmission latency is less important for some other data packets.

The former data packets are for instance control packets for the management of the communications network, or data packets related to a real-time application, such as video-streaming. For these data packets, what is important is to meet the latency constraint.

The latter data packets are for instance files contents downloaded from or uploaded to a communication device. For these data packets, what is important is to maximize the throughput, in order to reduce the overall transfer time period from the application standpoint. Said latter data packets are generally referred to as best effort data packets.

Generally, in order to take into account these two aspects, a scheduler device schedules the data packets by first serving the latency-constrained data packets to ensure that the latency constraint is met and by then serving the other data packets with the resources that are remaining.

SUMMARY OF INVENTION

Technical Problem

However, in the context of a frequency selective fading channel, this might result in allocating time-frequency resources for transmitting latency-constrained data packets which could have been more appropriately used for transmitting other data packets in order to maximize the throughput for said other data packets. Such frequency selective fading channel may be found in the context of a fixed base station communicating with mobile phones or even in the context of a moving base station, for instance a base station providing telecommunications infrastructure in a train or other moving conveyances.

On the other hand, if the scheduler device schedules the data packets by first serving the data packets that are not latency-constrained, it might result in not meeting the latency constraint for some latency-constrained data packets.

Solution to Problem

It is desirable to overcome the aforementioned problems which occur when scheduling transmissions of data packets over a frequency selective fading channel between devices of a communications network.

In particular, it is desirable to provide a solution that allows meeting latency constraints for transmitting latency-constrained data packets, as well as increasing the throughput for other data packets.

It is also desirable to provide a solution that allows meeting latency constraints for transmitting latency-constrained data packets, as well as increasing the throughput for other data packets, when scheduling transmissions of data packets over a frequency and time selective fading channel.

It is also desirable to provide a solution that further allows increasing the execution speed of the time-frequency allocation process and reducing complexity thereof.

To that end, the present invention concerns a method for allocating time-frequency resources to data packets for transmitting said data packets via a communications network in which communications are performed over a frequency selective channel, the method being performed by a scheduler device of the communications network, the method comprising: obtaining data packets to be transmitted, or descriptions thereof, each data packet being either a latency-constrained data packet or a non latency-constrained data packet; and obtaining information representative of transmission conditions for each channel over which at least one obtained data packet may be transmitted within a predefined time period. The method further comprises: performing an assignment of time-frequency resources within said predefined time period for transmitting data of non latency-constrained data packets, according to the obtained information representative of transmission conditions; performing a revision of the assignment so that at least one time-frequency resource is allocated to at least one respective transmission of data of the latency-constrained data packets instead of data of the non latency-constrained data packets, said revision being performed by minimizing a cost impact of the revision on a global performance metric related to the transmissions of said non latency-constrained data packets; and allocating the time-frequency resources as assigned to the non latency-constrained data that did not incur the assignment revision, whereas the latency-constrained data that incurred the assignment revision are put aside for later scheduling in a subsequent time period.

Thus, the method allows meeting latency constraints for transmitting latency-constrained data packets, as well as increasing the throughput for other data packets, with a cost effective approach.

According to a particular feature, the non latency-constrained data packets belong to sessions that are communication contexts between two communicating items of the communications network, and, for performing the assignment, the scheduler device performs plural loop iterations of the following: determining first time-frequency resource candidates of said predefined time period which has not yet been assigned and which has not yet been allocated; for each first time-frequency resource candidate: determining, for each session, a first performance metric, according to the obtained information representative of the transmission conditions; finding the couple time-frequency resource candidate plus session showing the best performance according to the first performance metric; and, assigning the time-frequency resource candidate of said couple for transmitting non latency-constrained data of the session of said couple.

Thus, optimization is achieved with low complexity by using a simple algorithm that associates a time-frequency resource candidate with a session of non latency-constrained data packet transmissions at each iteration of the algorithm.

According to a particular feature, for performing the revision of the assignment and the allocation of time-frequency resources for transmitting the data of the latency-constrained data packets, the scheduler device performs plural loop iterations of the following: determining second time-frequency resource candidates of said predefined time period which has not yet been allocated; for each second time-frequency resource candidate: determining, for each non latency-constrained data packet, a second performance metric, according to the obtained information representative of the transmission conditions; finding the couple time-frequency resource candidate plus non latency-constrained data packet showing the best performance according to the second performance metric under a constraint of minimizing the cost impact, on said global performance metric, of pre-empting of the time-frequency resource when previously assigned for transmitting non latency-constrained data; and allocating the time-frequency resource candidate of said couple for transmitting data of the latency-constrained data packet of said couple.

Thus, the revision of the assignment is an optimization problem that is solved with low complexity by using a simple algorithm that associates a time-frequency resource candidate with a latency-constrained data packet at each iteration of the algorithm.

According to a particular feature, the first performance metric is defined, for the selected time-frequency resource candidate i, as follows:

$$\frac{r_k(i)}{(R_k)^\alpha}$$

wherein k represents the considered session, $r_k(i)$ represents a data rate achievable via the time-frequency resource candidate i for said session according to the obtained information representative of transmission conditions, $R_k$ represents a data rate achieved for said session since the beginning of its non-latency constrained data transfer in the execution of the loop iterations and $\alpha$ is a predefined integer parameter such that $\alpha \geq 0$.

Thus, the utility function used in the algorithm is simple to calculate and flexible, in the sense that the parameter $\alpha$ allows for tuning a trade-off between quality of service and transmission efficiency.

According to a particular feature, said global performance metric is defined as follows:

$$\sum_k f_\alpha(R_k)$$

wherein $R_k$ is the average rate of the session identified by k after the execution of the loop iterations for said predefined time period and wherein $f_\alpha$ is a utility function that depends on the predefined parameter $\alpha$ and that is defined as follows:

$$\begin{cases} f_\alpha(x) = \frac{x^{1-\alpha}}{1-\alpha}, \alpha \geq 0, \alpha \neq 1 \\ f_\alpha(x) = \log(x), \alpha = 1 \\ f'_\alpha(x) = x^{-\alpha} \end{cases}$$

wherein $f'_\alpha$ is the derivative function of the utility function $f_\alpha$.

Thus, the global performance metric is linked to the first performance metric, which involves that the final performance after the execution of the optimization with the first performance metric can easily be evaluated.

According to a particular feature, the second performance metric is defined, for the selected time-frequency resource candidate i, as follows:

$$\frac{\left(\left(\frac{\rho_{k'}}{(R_{k'})}\right)^{\beta-1} \frac{r_{k'}(i)}{(R_{k'})}\right)}{\lambda + c(i)}$$

wherein k' represents the considered latency-constrained data packet, $r_{k'}(i)$ represents the data rate achievable via the time-frequency resource candidate i for said latency-constrained data packet according to the obtained information representative of transmission conditions, $R_{k'}$ represents the data rate achieved for said latency constrained data packet since the beginning of its transmission, $\beta$ is a predefined parameter, $\rho_{k'}$ represents a minimum data rate for meeting the latency constraint for said latency-constrained data packet, c(i) represents the cost impact on said global performance metric involved by potentially pre-empting the time-frequency resource candidate i when previously assigned for transmitting non latency-constrained data, and $\lambda$ represents a non-null constant.

Thus, the revision of the assignment takes into account both the gain of selecting said time-frequency resource for transmitting latency-constrained data and the loss induced, by the potential pre-emption, on the non-latency constrained sessions.

According to a particular feature, the cost impact c(i) is expressed as follows:

$$c(i) = f_\alpha(R_k) - f_\alpha(\hat{R}_k(i))$$

wherein $\hat{R}_k(i)$ is the average rate recomputed for the session represented by k as if pre-emption of the time-frequency resource candidate i occurs.

Thus, the cost of pre-empting a time-frequency resource previously assigned for transmitting non-latency constrained data for the benefit of transmitting latency constrained data is computed easily.

According to a particular feature, $\hat{R}_k(i)$ is defined as follows:

$$\hat{R}_k(i) = R_k - \mu r_k(i)$$

wherein $\mu$ is a predefined forgetting factor such that $0 < \mu < 1$.

Thus, the estimation of the average rate after the hypothetic pre-emption of said time-frequency resource is easily computed.

According to a particular feature, the scheduler device performs beforehand, for each latency-constrained data packet k', a conversion of the latency constraint to be met by said latency-constrained data packet into the minimum data rate $\rho_{k'}$ as follows:

$$\rho_{k'} = P_{k'}/l_{k'}$$

wherein $P_{k'}$ represents the amount of data to be transmitted for said latency-constrained packet under said latency constraint and $l_{k'}$ represents a delay before reaching the latency constraint deadline instant to be met by said latency-constrained data packet.

Thus, the latency constraint is converted into a rate constraint, which is a more relevant metric for taking into account the channel quality in a multi-user scheduling context.

The present invention also concerns a scheduler device for allocating time-frequency resources to data packets for transmitting said data packets via a communications network in which communications are performed over a frequency selective channel, the scheduler device comprising: means for obtaining data packets to be transmitted, or descriptions thereof, each data packet being either a latency-constrained data packet or a non latency-constrained data packet; and means for obtaining information representative of transmission conditions for each channel over which at least one obtained data packet may be transmitted within a predefined time period. The scheduler device further comprises: means for performing an assignment of time-frequency resources within said predefined time period for transmitting data of non latency-constrained data packets, according to the obtained information representative of transmission conditions; means for performing a revision of the assignment so that at least one time-frequency resource is allocated to at least one respective transmission of data of the latency-constrained data packets instead of data of the non latency-constrained data packets, said revision being performed by minimizing a cost impact of the revision on a global performance metric related to the transmissions of said non latency-constrained data packets; and means for allocating the time-frequency resources as assigned to the non latency-constrained data that did not incur the assignment revision, whereas the latency-constrained data that incurred the assignment revision are put aside for later scheduling in a subsequent time period.

The present invention also concerns, in at least one embodiment, a computer program that can be downloaded from a communication network and/or stored on a medium that can be read by a computer and run by a processor. This computer program comprises instructions for implementing the aforementioned method in any one of its various embodiments, when said program is run by the processor.

The present invention also concerns an information storage medium, storing a computer program comprising a set of instructions that can be run by a processor for implementing the aforementioned method in any one of its various embodiments, when the stored information is read from the information storage medium by a computer and run by a processor.

Since the features and advantages related to the scheduler device and to the computer program are identical to those already mentioned with regard to the aforementioned method, they are not repeated here.

The characteristics of the invention will emerge more clearly from a reading of the following description of an example of embodiment, said description being produced with reference to the accompanying drawings, among which:

DESCRIPTION OF EMBODIMENTS

Although the following description is performed in the scope of a wireless communications network, the principles detailed hereafter may be applied to communications networks of other kind, such as optical communications networks or wired communications network, in which a frequency-selective transmission medium is shared. At physical layer, the transmissions shall be performed over a frequency selective fading channel, in which channel variations are frequency dependent. In wireless communications networks, such channel variations arise mainly due to multipath effect. The transmissions may also be performed over a channel that is further a time selective fading channel, in which channel variations are time dependent. In wireless communications networks, such channel variations arise mainly due to relative mobility between communication devices, which results in environmental changes.

In order to schedule transmissions of latency-constrained and non latency-constrained data packets over a frequency selective fading channel within a predefined time period in such a way that latency constraints for transmitting the latency-constrained data packets are met while increasing the throughput for the non latency-constrained data packets, it is proposed: (a) to perform assignment of time-frequency resources to the non latency-constrained data packets; then, (b) to possibly (when not enough time-frequency remains for the latency-constrained data packets within said time period) perform a revision of the assignment so that time-frequency resources are allocated to latency-constrained data packets instead of non latency-constrained data packets, said revision being performed by minimizing cost impact of the revision on a global performance metric related to the transmissions of said non latency-constrained data packets, and then, (c) to allocate the time-frequency resources as assigned to the non latency-constrained data packets that did not incur the assignment revision, whereas the latency-constrained data packets that incurred the assignment revision are put aside for later scheduling in a next time period.

Figure 1:
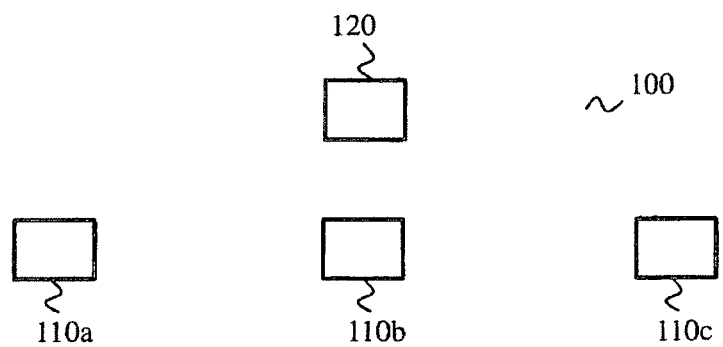
FIG. 1 schematically represents an architecture of a wireless communications network in which the present invention may be implemented.

FIG. 1 schematically represents an architecture of a wireless communications network 100 in which the present invention may be implemented.

The wireless communications network 100 comprises a scheduler device 120 and communication devices 110a, 110b and 110c. The communication devices 110a, 110b and 110c are hereinafter referred to as communication terminals.

Figure 4:
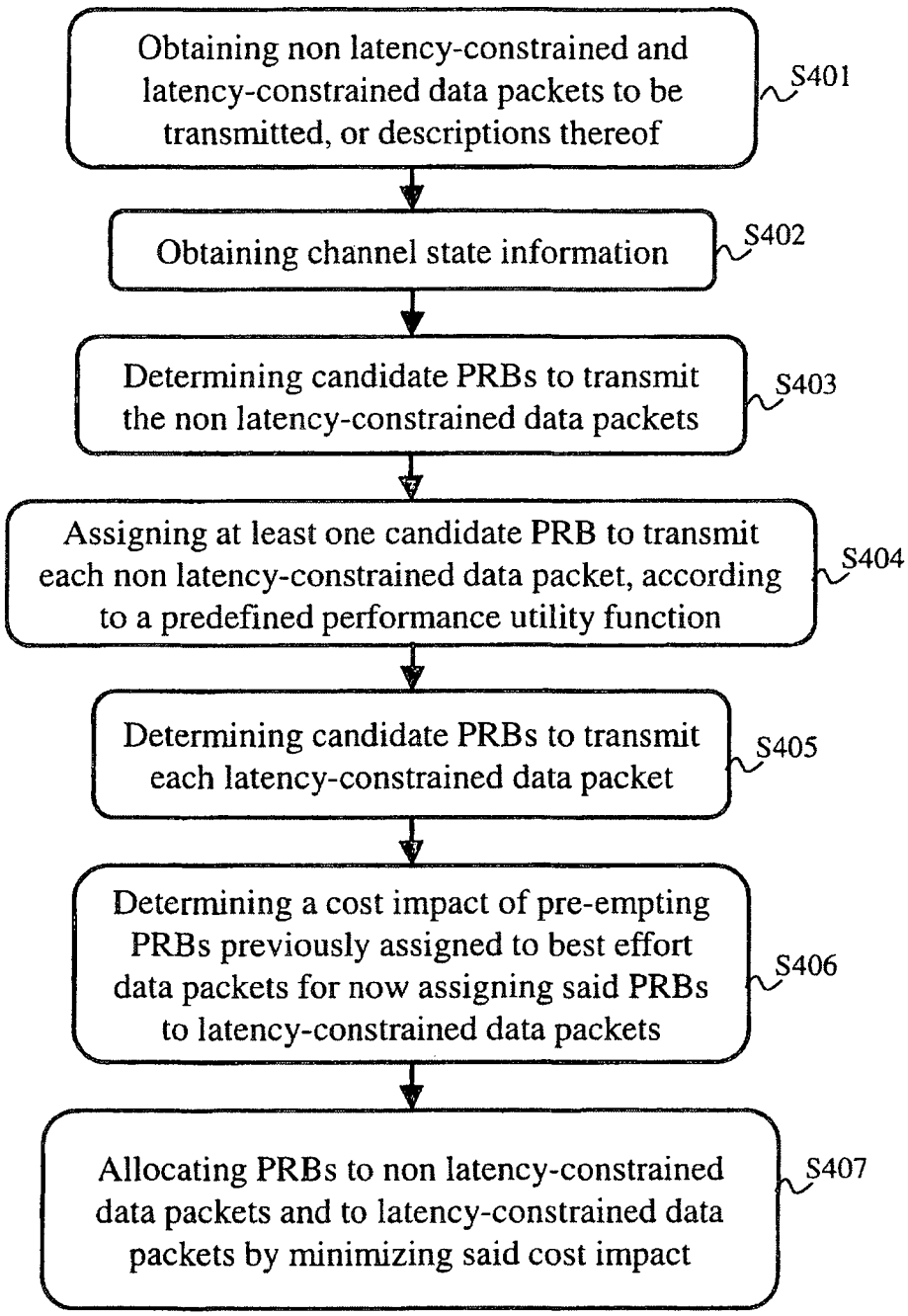
FIG. 4 schematically represents an algorithm for allocating time-frequency resources for transmitting data packets via the wireless communications network of FIG. 1.

The scheduler device 120 is in charge of scheduling the communications in the wireless communications network 100, as described hereafter with regard to FIG. 4. In other words, the scheduler device 120 is in charge of allocating time-frequency resources for enabling the transmission of data packets via the wireless communications network 100.

The scheduler device 120 may be included in a base station, either fixed or moving. For instance, such a base station may be located in a moving conveyance, such as a train.

In a variant, the scheduler device 120 may be a dedicated device external to such a base station.

In another variant, the scheduler device 120 may be included in an "Evolved NodeB (eNodeB)" according to the 3GPP (3$^{rd}$ Generation Partnership Project) standards terminology, which performs radio resource management in the scope of the LTE (Long Term Evolution) systems and LTE-Advanced.

In yet another variant, the scheduler device 120 may further be included in a "Home eNodeB (HeNB)", which is connected to an existing residential broadband service and provides LTE radio coverage for LTE handsets within a home.

In yet another variant, the scheduler device 120 may be included in a relay node and perform scheduling for inter-devices communications.

Each communication terminal 110a, 110b, 110c is then a user equipment (UE) according to the 3GPP standards terminology.

The data packets transmitted via the wireless communications network 100 are of two main types: latency-constrained data packets and other data packets, i.e. non latency-constrained data packets (best effort data packets).

Latency-constrained data packets need to be provided to a destination communication terminal in a given timeframe. Latency-constrained data packets comprise for instance control data for the management of the wireless communications network 100 or real-time data for gaming applications, VoIP (Voice over Internet Protocol) applications, audio and/or video streaming applications. Latency-constrained data packets are either: of small size but with typically high redundancy ratio to avoid any damageable loss during transmission, such as control data packets; or, of large size but with typically very low redundancy ratio, as losses are not strictly damageable for the overall performance of the application, such as for audio and/or video streaming data packets.

On the contrary, data packets that are not latency-constrained don't need to be provided to a destination communication terminal in a given timeframe, but generally require a higher number of resources. It is however preferable transmitting such data packets in a timeframe as short as possible. Such data packets that are not latency-constrained comprise for instance files contents data downloaded to or uploaded from a communication terminal. Such data packets that are not latency-constrained are of high size with typically high redundancy ratio to avoid any damageable loss during transmission. Therefore, such data packets involve a high bandwidth consumption.

The communications within the wireless communications network 100 may be downlink communications from the scheduler device 120 to the communication terminals 110a, 110b, 110c and/or uplink communications from the communication terminals 110a, 110b, 110c to the scheduler device 120 and/or direct communications between the communication terminals 110a, 110b, 110c.

The communications within the wireless communications network 100 are scheduled and time-frequency resources are allocated by the scheduler device 120 according to a time-frequency resource grid.

Figure 3:
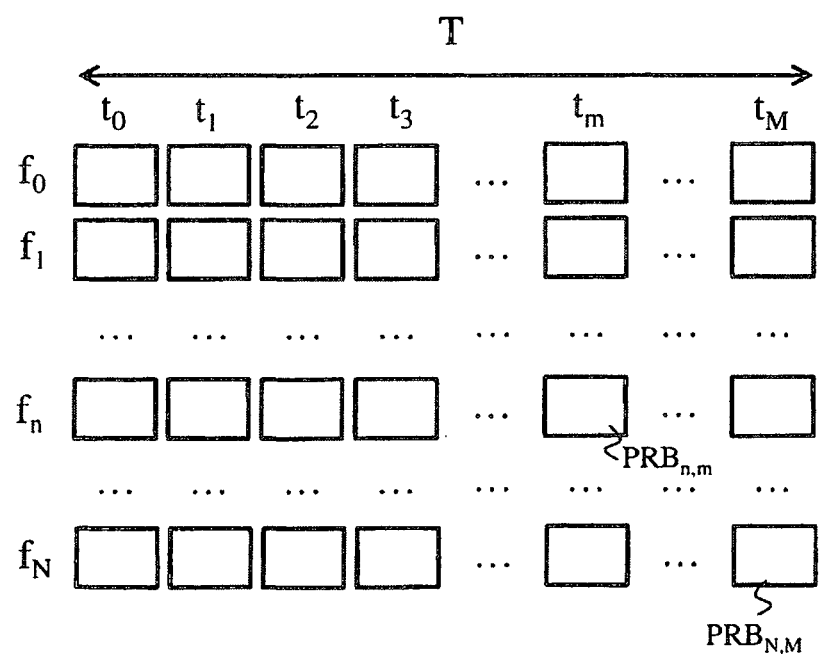
FIG. 3 schematically represents a time-frequency resource grid for scheduling communications in the wireless communications network of FIG. 1.

FIG. 3 schematically represents an example of such a time-frequency resource grid for scheduling communications in the wireless communications network 100.

The communications in the wireless communications network 100 preferably use OFDM (Orthogonal Frequency Division Multiplexing). The communication resources can then be divided into plural frequencies or sets of frequencies $f_n$, wherein n is an index that can take values from 0 to N, wherein N+1 represents the total quantity of said frequencies or sets of frequencies, and into plural time intervals $t_m$, wherein m is an index that can take values from 0 to M, wherein M+1 represents the total quantity of said time intervals for a time period T of predefined duration. All time intervals $t_m$ have the same duration, which is predefined.

For instance, according to LTE requirements, each set of frequencies $f_n$ may consist of twelve subcarriers.

Each time interval $t_m$ for a given frequency or set of frequencies $f_n$ forms a time-frequency resource, also referred to as Physical Resource Block $PRB_{n,m}$. Such time-frequency-resource is generally denoted hereafter PRB.

Therefore, for a given frequency or set of frequencies $f_n$, the time-frequency resource grid comprises M+1 PRBs, denoted from $PRB_{n,0}$ to $PRB_{n,M}$; and, for a given time interval $t_m$, the time-frequency resource grid comprises N+1 PRBs, denoted from $PRB_{0,m}$ to $PRB_{N,m}$.

Several approaches exist for filling in the PRBs. As would be apparent in the description hereafter, the effective capacity of a PRB depends on the channel over which the data within said PRB are transmitted. One approach is that data packets are defined in order to fit in any PRB. Spectral efficiency can however be improved.

A preferred approach is that non latency-constrained data packets are stored in independent buffers according to the session said data packets belong to. A session is a communication context between two communicating items exchanging data packets, whatever said data packets are transported in connectionless mode or in connected mode. Said session can be a control session, in which control data packets are exchanged. Said session can be a file transfer session, in which data packets are control packets or user data packets, both related to either the file to be transferred or management thereof. Many other examples of sessions in data packets exchange protocols exist in the state of the art, as well known by the ordinary one with skills in the art. Thus, once PRBs are allocated to a session, the transmission occurs within said PRBs by picking up from the corresponding buffer the amount of data (segmentation) that said PRBs are able to transport in view of their respective capacities, which depend on the propagation conditions between said communication items. Regarding latency-constrained data, packets belong to data flows in respective sessions. A preferred approach is to however operate on a per data packet basis, which is equivalent to considering that each data packet is a stand-alone session. This consideration is due to the fact that each data packet has its latency constraint to meet independently from the other latency-constrained data packets.

Figure 2A:
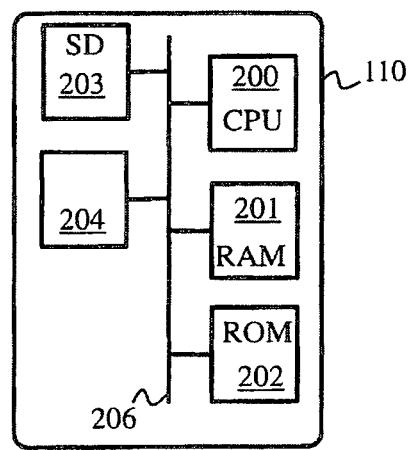
FIG. 2A schematically represents an architecture of a communication terminal of the wireless communications network of FIG. 1.

FIG. 2A schematically represents an architecture of a communication terminal 110, which could be any communication terminal 110a, 110b or 110c.

According to the shown architecture, the communication terminal 110 comprises the following components interconnected by a communications bus 206: a processor, microprocessor, microcontroller or CPU (Central Processing Unit) 200; a RAM (Random-Access Memory) 201; a ROM (Read-Only Memory) 202; a SD (Secure Digital) card reader 203, or any other device adapted to read information stored on storage means; and, a wireless communication interface 204.

CPU 200 is capable of executing instructions loaded into RAM 201 from ROM 202 or from an external memory, such as an HDD (Hard-Disk Drive) or an SD card. After the communication terminal 110 has been powered on, CPU 200 is capable of reading instructions from RAM 201 and executing these instructions that form one computer program.

Any and all steps performed by the communication terminal 110 may be implemented in software by execution of a set of instructions or program by a programmable computing machine, such as a PC (Personal Computer), a DSP (Digital Signal Processor) or a microcontroller; or else implemented in hardware by a machine or a dedicated component, such as an FPGA (Field-Programmable Gate Array) or an ASIC (Application-Specific Integrated Circuit).

The wireless communication interface 204 enables the communication terminal 110 to exchange signals with the scheduler device 120. The wireless communication interface 204 may enable the communication terminal 110 to exchange signals with other communication terminals of the wireless communications network 100.

Figure 2B:
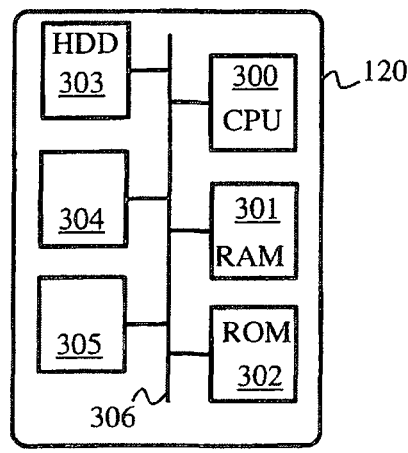
FIG. 2B schematically represents an architecture of a scheduler device of the wireless communications network of FIG. 1.

FIG. 2B schematically represents an architecture of the scheduler device 120.

According to the shown architecture, the scheduler device 120 comprises the following components interconnected by a communications bus 306: a processor, microprocessor, microcontroller or CPU 300; a RAM 301; a ROM 302; an HDD 303, or any other device adapted to read information stored on storage means; a first wireless communication interface 304; and, a second wireless communication interface 305.

CPU 300 is capable of executing instructions loaded into RAM 301 from ROM 302 or from an external memory, such as HDD 303. After the scheduler device 120 has been powered on, CPU 300 is capable of reading instructions from RAM 301 and executing these instructions. The instructions form one computer program that causes CPU 300 to perform some or all of the steps of the algorithm described hereafter with regard to FIG. 4.

Any and all steps of the algorithm described hereafter with regard to FIG. 4 may be implemented in software by execution of a set of instructions or program by a programmable computing machine, such as a PC, a DSP or a microcontroller; or else implemented in hardware by a machine or a dedicated component, such as an FPGA or an ASIC.

The first wireless communication interface 304 enables the scheduler device 120 to exchange signals with any communication terminal 110a, 110b or 110c.

The second wireless communication interface 305 enables the scheduler device 120 to exchange signals with devices of another communications network, such as a core network in a telephony communications system.

FIG. 4 schematically represents an algorithm, performed by the scheduler device 120, for allocating time-frequency resources (PRBs) for transmitting data packets via the wireless communications network 100. The scheduler device 120 performs PRBs allocation per time periods of predefined duration T. The algorithm of FIG. 4 can be performed for each time period of predefined duration T of consecutive such time periods, or by relying on a sliding window of predefined duration T.

In a step S401, the scheduler device 120 obtains data packets, or description thereof, to be transmitted via the wireless communications network 100, and stores information related to the obtained data packets or descriptions thereof.

For downlink transmissions, when the scheduler device 120 is included in a base station, the scheduler device 120 receives descriptions of data packets to be transmitted by the base station or said data packets themselves. The data packets may be transmitted to the scheduler device 120 via an API (Application Programming Interface) and the scheduler device 120 may be able to parse the protocol headers present in the data packets to determine at least the type of the data packet to be transmitted, i.e. either latency-constrained data packet or other data packet.

For instance, the scheduler device 120 being implemented at the MAC (Medium Access Control) layer of the base station, the scheduler device 120 is able to parse the header fields of the data packets received from upper layers and to determine whether the data packet comprises TCP (Transport Control Protocol, as specified by the standard RFC-793) data or UDP (User Datagram Protocol, as specified by the standard RFC-768) data or SCTP (Stream Control Transmission Protocol, as specified by the standard RFC-4960) data. The scheduler device 120 may even be able to obtain more detailed information by determining whether the data packet moreover comprises an application layer protocol header, such as a TFTP (Trivial File Transfer Protocol, as defined by the standard RFC-1350) header. According to this example, TCP data packets can be considered as data packets that are not latency-constrained, whereas UDP data packets are considered as latency-constrained data packets, except when the UDP data packets encapsulate TFTP data. Therefore, by parsing the header fields of the data packets, the scheduler device 120 is able to categorize the data packets to be transmitted between latency-constrained data packets and non latency-constrained data packets (best effort data packets).

For uplink transmissions, when the scheduler device 120 is included in a base station, the scheduler device 120 receives from the communication terminals 110a, 110b, 110c descriptions of data packets to be transmitted by said communication terminals. The same situation occurs when the scheduler device 120 manages communications directly setup between the communication terminals.

The data packet descriptions shall contain enough information to enable the scheduler device 120 to determine at least the type of the concerned data packets, i.e. either latency-constrained data packets or other data packets (best effort data packets).

Said data packet descriptions may be obtained via radio bearers as implemented in telecommunication systems relying for instance on UMTS (Universal Mobile Telecommunications System) or LTE technologies. Indeed, when activating a service within such a telecommunication system, radio bearers allow exchanging information related to characteristics of data packets transmitted within said service, and more particularly information indicating whether said data packets are latency-constrained or not, as well as information representative of the latency constraint to be met, if any, by said data packets.

In a following step S402, the scheduler device 120 obtains information representative of transmission conditions for each channel over which at least one data packet may be transmitted. In other words, the scheduler device 120 obtains information representative of transmission conditions for each PRB among a set $\Omega_j$, which gathers all possible PRBs of the time period $T_j$ that has a fixed duration T and that corresponds to the j-th execution of the algorithm of FIG. 4, i.e. all PRBs in the time-frequency resource grid as shown in FIG. 3 for the time period $T_j$.

The scheduler device 120 may obtain CSI (Channel State Information) for each channel over which at least one data packet may be transmitted. CSI is determined by receiver devices. When the communication channel is reciprocal, CSI determined for the communication channel from a first communication device to a second communication device can be used as CSI for the communication channel from the second communication device to the first communication device. CSI may be determined by the communication terminals 110a, 110b, 110c when receiving signals from the scheduler device 120 or other communication terminals and then be transmitted to the scheduler device 120. CSI may be determined by the scheduler device 120 when receiving signals from the communication terminals 110a, 110b, 110c.

When plural sub-carriers are used for each PRB, such as for LTE transmissions, an equivalent CSI is determined by combining CSI obtained for said plural sub-carriers.

The communication terminals 110a, 110b, 110c may obtain such information by short-term measurements performed on the channels. Such short-term channel state information is practically suitable for slow-varying channel conditions.

The communication terminals 110a, 110b, 110c may also obtain such information by long-term measurements performed on the channels, on the basis of the SINR (Signal to Interference-plus-Noise Ratio). Such long-term channel state information is practically suitable for fast-varying channel conditions. It means that some channels in the wireless communications network 100 may be considered as frequency flat channels over the duration T of the time period $T_j$.

An approach for determining CSI is based on a training sequence, or pilot sequence, where a known signal is transmitted and the channel matrix representing the channel conditions is estimated using the combined knowledge of the signal as transmitted and as received.

In case of fading channels that are further time selective, a Kalman filter may be used to perform predictions of the upcoming channels conditions, on the basis of preceding short-term channel state information.

In a following step S403, the scheduler device 120 determines which PRBs may be used to transmit data of the non latency-constrained data packets within the time period T. Indeed, some time-frequency resources may not be available due to a preceding allocation to another transmission. Such a situation occurs notably when relying on a sliding window approach for managing the successive time periods $T_j$. The PRBs as determined in the step S403 therefore form candidate PRBs to transmit data of the non latency-constrained data packets within the time period T. Said candidate PRBs are PRBs of the time period $T_j$ that were not already allocated to any latency-constrained data transmission and that were furthermore not already assigned to any non latency-constrained data transmission.

In a following step S404, the scheduler device 120 assigns, among the candidate PRBs determined in the step S403, at least one PRB for transmitting non latency-constrained data (best effort data packet) from amongst those that has been obtained, or description thereof, in the step S401. Such assignment is preferably performed until either there is no more non-assigned PRB in the time period or there is no more pending non latency-constrained data packets. As detailed hereafter with regard to FIG. 5, said assignment is performed according to a first performance metric related to the transmission of non latency-constrained data packets, such that said assignment provides the best performance according to said first performance metric, which is representative of a trade-off criterion between quality of service and transmission efficiency (e.g. throughput per session, global throughput, spectral occupancy, energy consumption, interference level generated, . . . ).

PRBs assignment as performed in the step S404 is not a definitive allocation of said PRBs. Indeed, as apparent in the description hereafter, said PRBs may still be pre-empted for transmissions of latency-constrained data within the time period $T_j$, or even within a subsequent time period when a sliding window approach is used as far as said PRB is still present in the PRB grid formed by said subsequent time period. A particular embodiment for performing the PRBs assignment of the step S404 is detailed hereafter with regard to FIG. 5.

In a following step S405, the scheduler device 120 determines which PRB or PRBs may be used to transmit data of the latency-constrained data packets within the time period $T_j$ (independently of whether said time-frequency resources have or have not been assigned in the step S404 for transmitting non latency-constrained data). Indeed, some PRBs may not be available due to a preceding allocation to other latency-constrained data transmissions. Such a situation occurs notably when relying on a sliding window approach for managing the successive time periods $T_j$. Such a situation also occurs when the latency constraint to be met leads to a transmission deadline instant that is sooner than the end of the considered time period $T_j$, which there means that PRBs later than said transmission deadline instant are not candidate PRBs to transmit the latency-constrained data that shall meet said latency constraint. The PRBs as determined in the step S405 therefore form candidate PRBs to transmit the latency-constrained data within the time period $T_j$. Said candidate PRBs are PRBs of the time period $T_j$ that were not already allocated to any latency-constrained data transmission, even if said PRBs were assigned to non latency-constrained data transmissions in the step S404, are considered as candidate PRBs.

In a following step S406, the scheduler device 120 determines a cost impact c(i) for pre-empting, for transmitting latency-constrained data, PRBs i (if any) that were assigned in the step S404 for transmitting non latency-constrained data. Therefore, the scheduler device 120 determines a cost impact on a global performance metric related to the transmissions of the non latency-constrained data when PRB pre-emption needs to be performed for transmitting latency-constrained data within the time period $T_j$.

In a following step S407, the scheduler device 120 allocates, among the candidate PRBs determined in the step S405, at least one PRB for transmitting latency-constrained data amongst those that has been obtained, or descriptions thereof, in the step S401. The allocation for transmitting latency-constrained data may necessitate pre-empting at least one PRB that was assigned in the step S404 for transmitting non latency-constrained data (best effort data). As detailed hereafter with regard to FIG. 6, pre-emption is preferably performed by optimizing a second performance metric related to the transmission of latency-constrained data packets, such that said allocation provides the best performance according to said second performance metric, which is representative of a trade-off criterion between quality of service and transmission efficiency. Pre-emption is performed under a constraint of minimizing the cost impact of the pre-emption on the performance of the transmissions of the non latency-constrained data packets, as shown by the global performance metric. A particular embodiment for performing the PRBs allocation of the step S407 (in conjunction with determining the cost impact of any pre-emption to be investigated) is detailed hereafter with regard to FIG. 6.

Then, the scheduler device 120 allocates the PRBs of the time period $T_j$, which were assigned to non latency-constrained data transmissions in the step S404 and which were not pre-empted in the step S407 for transmitting latency-constrained data, to transmissions of data of the non latency-constrained data packets to which said PRBs were assigned in the step S404. In other words, for the non latency-constrained data packets that did not incur PRB pre-emption in the step S407, the scheduler device 120 confirms the assignment that was performed in the step S404. The scheduler device 120 then put aside the non latency-constrained data that incurred PRB pre-emption in the step S407 for a later transmission (in another time period $T_{j'}$, with j'≥j).

Figure 5:
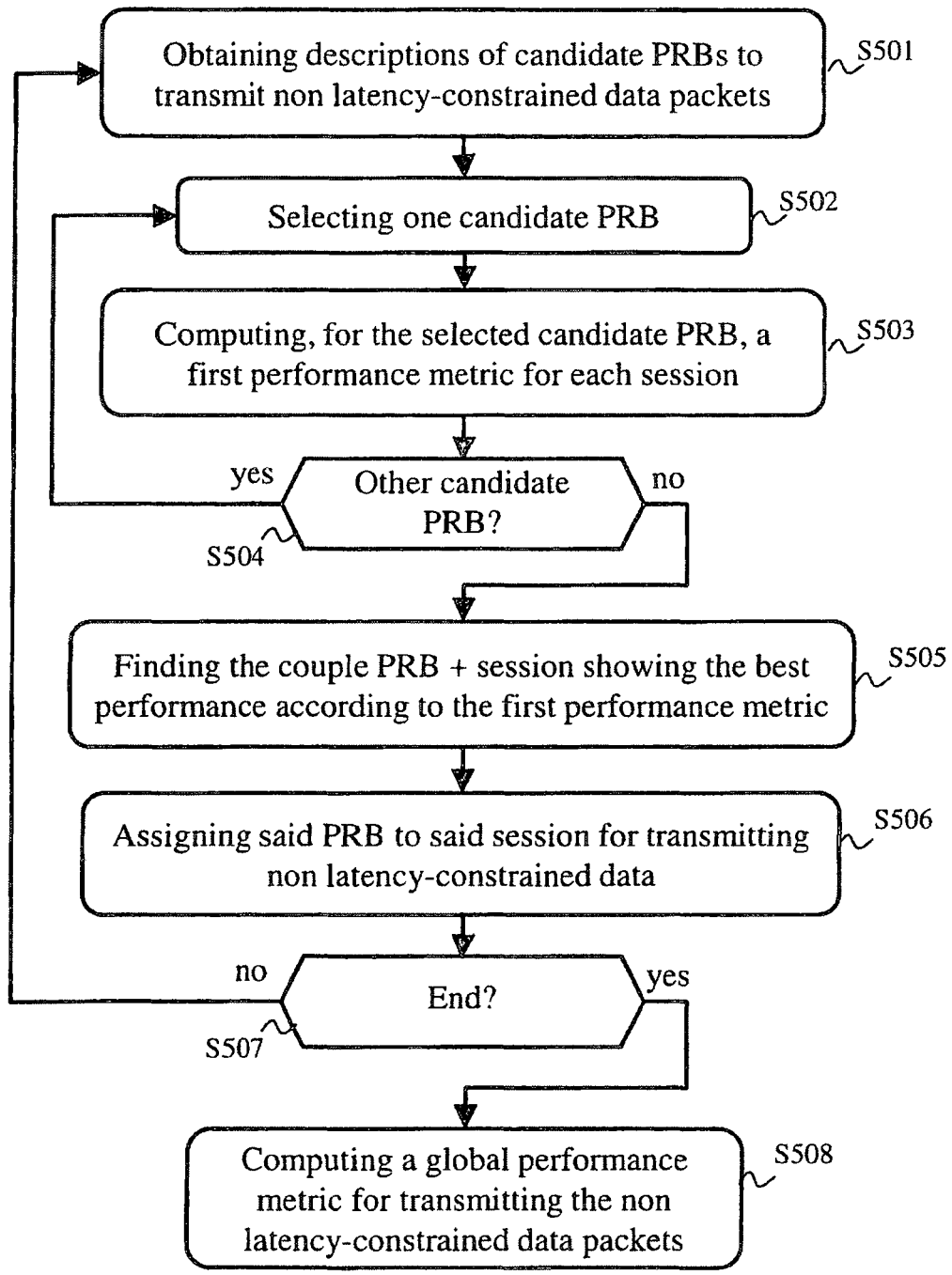
FIG. 5 schematically represents an algorithm for assigning time-frequency resources for transmitting non latency-constrained data packets via the wireless communications network of FIG. 1, in a particular embodiment of the invention.

FIG. 5 schematically represents an algorithm for assigning time-frequency resources (PRBs) for transmitting non latency-constrained data packets via the wireless communications network 100, in a particular embodiment of the invention.

As will be apparent in the following description, the algorithm of FIG. 5 comprises plural iterations represented by an index q, of a loop (between steps S501 and S507). One PRB is assigned per loop to transmit non latency-constrained data, as detailed hereafter. Loop iterations are preferably performed until either there is no more non-assigned PRB in the considered time period $T_j$ or there is no more pending non latency-constrained data.

In the first occurrence of the step S501 during the execution of the algorithm of FIG. 5, the index q is set to the value "1" and the index q is incremented by one unit each time the step S501 is repeated (new loop iteration).

In the step S501, the scheduler device 120 obtains descriptions of candidate PRBs to transmit non latency-constrained data within the considered time period $T_j$. In the first occurrence of the step S501 during the execution of the algorithm of FIG. 5, said descriptions of candidate PRBs result from the execution of the step S403. During subsequent loop iterations, the candidate PRBs evolve due to PRB assignment as detailed hereafter. The scheduler device 120 therefore considers a different set $\Omega_q$ of candidate PRBs at each loop iteration.

In a following step S502, the scheduler device 120 selects one candidate PRB among the candidate PRBs, the descriptions of which having been obtained in the step S501. For instance, the selection is arbitrarily done, or done according to a predefined criterion.

In a following step S503, the scheduler device 120 computes, for the candidate PRB selected in the step S502, the first performance metric for each session, as a function of the channel state information obtained in the step S402. Indeed, especially in the domain of wireless communications network, the performance of one PRB differs from one user to another due to different relative positions of the devices concerned by the session to which the data packet to be transmitted via said PRB belongs.

In a particular embodiment, the first performance metric is defined as follows:

$$\frac{r_k(i)}{(R_k)^\alpha}$$

wherein k represents the considered session, $r_k(i)$ represents a data rate achievable via the PRB i among the set $\Omega_q$ for said session identified by k, according to the information representative of transmission conditions obtained in the step S402, wherein $R_k$ is representative of a data rate achieved for said session identified by k since the beginning of its non-latency constrained data transfer in the execution of the algorithm of FIG. 5 (i.e. as achieved in the q-th loop iteration) and α is a predefined integer parameter such that α≥0. The first performance metric as expressed above is representative of an appropriate PRB selection criterion for optimizing the global performance metric, which is defined hereafter for what more particularly concerns the scope of the algorithm of FIG. 5.

In a following step S504, the scheduler device 120 checks whether there is at least one other PRB that still needs to be considered with respect to the first performance metric. When there is at least one other PRB that still needs to be considered with respect to the first performance metric, the step S502 is repeated by selecting one said PRB; otherwise, a step S505 is performed.

In the step S505, the scheduler device 120 finds, among the candidate PRBs and among the sessions, the couple PRB plus session that shows the best performance according to the first performance metric. Depending on the effective definition of the first performance metric, the couple PRB plus session that shows the best performance may be the one showing the highest value of the first performance metric or the one showing the lowest value of the first performance metric.

In a following step S506, the scheduler device 120 assigns the PRB of said couple for transmitting non latency-constrained data of the session of said couple and updates the average rates $R_k$ for all sessions accordingly (assigning one PRB to one session may increase the average rate for said session and decreases the average rate for the other sessions).

In said particular embodiment of the first performance metric, when the session identified by k has been assigned the PRB i during the step S506, the average rate $R_k$ is updated by considering the assignment with data rate $r_k(i)$. It is considered that, at the beginning of the session identified by k (session establishment), the average rate $R_k$ is null. Updating the average rate $R_k$ for the session identified by k which has been assigned in the step S506 a PRB i providing a data rate $r_k(i)$ is for example performed as follows:

$$R_k \leftarrow R_k + \mu(r_k(i) - R_k)$$

wherein μ is a predefined forgetting factor such that 0<μ<1.

Moreover, when the session identified by k has not been assigned any PRB during the step 5506, the average rate $R_k$ is updated by considering no assignment, which results in a decrease of the average rate $R_k$. Updating the average rate $R_k$ for the session identified by k which has not been assigned in the step S506 any PRB is for instance performed as follows:

$$R_k \leftarrow R_k - \mu R_k$$

In the following step S507, the scheduler device 120 checks whether at least one other loop iteration remains to be performed. As already mentioned, loop iterations are preferably performed until either there is no more non-assigned PRB among the candidate PRBs in the considered time period $T_j$ or there is no more pending non latency-constrained data. Another criterion that can be used instead, or in addition, is that loop iterations be performed as far as a predefined processing timeout has not expired since the beginning of the execution of the algorithm of FIG. 5 for the considered time period $T_j$. When at least one loop iteration remains to be performed, the step S501 is repeated for a new loop iteration with an updated list of candidate PRBs, the PRB assigned in the immediately preceding occurrence of the step S506 being removed from said list of candidate PRBs; otherwise, a step S508 is performed.

In the step S508, the scheduler device 120 computes the global performance metric for transmitting the non latency-constrained data packets within the considered time period $T_j$. In the scope of said particular embodiment of the first performance metric, the global performance metric is defined as follows:

$$\sum_k f_\alpha(R_k)$$

wherein $R_k$ is the result of the average rate of the session identified by k after the execution of the algorithm of FIG. 5 for the considered time period $T_j$ and wherein $f_\alpha$ is a utility function that depends on the predefined parameter $\alpha$ and that is defined as follows:

$$\begin{cases} f_\alpha(x) = \dfrac{x^{-1-\alpha}}{1-\alpha}, \alpha \geq 0, \alpha \neq 1 \\ f_\alpha(x) = \log(x), \alpha = 1 \\ f'_\alpha(x) = x^{-\alpha} \end{cases}$$

wherein $f'_\alpha$ is the derivative function of the utility function $f_\alpha$.

It can be noticed that, by a Taylor expansion of the utility function $f_\alpha$ around $R_k$, the loop iterations based on the first performance metric as expressed above leads to maximizing the global performance metric as expressed above, which provides a trade-off between system spectral efficiency (related to the total throughput in the time period $T_j$) and quality of experience for each session of non latency-constrained data. In other words, the PRBs assignment for the time period $T_j$ for transmitting non latency-constrained data is such that:

$$(\hat{k}_j, \hat{\iota}_j) = \arg\max_{k, i \in \Omega_q} \dfrac{r_k(i)}{(R_k)^\alpha}$$

wherein $(\hat{k}_q, \hat{\iota}_q)$ represents the couple PRB (said PRB being identified by $\hat{\iota}_q$) plus session (identified by $\hat{k}_q$) found in the step S505 at the q-th loop iteration.

Figure 6:
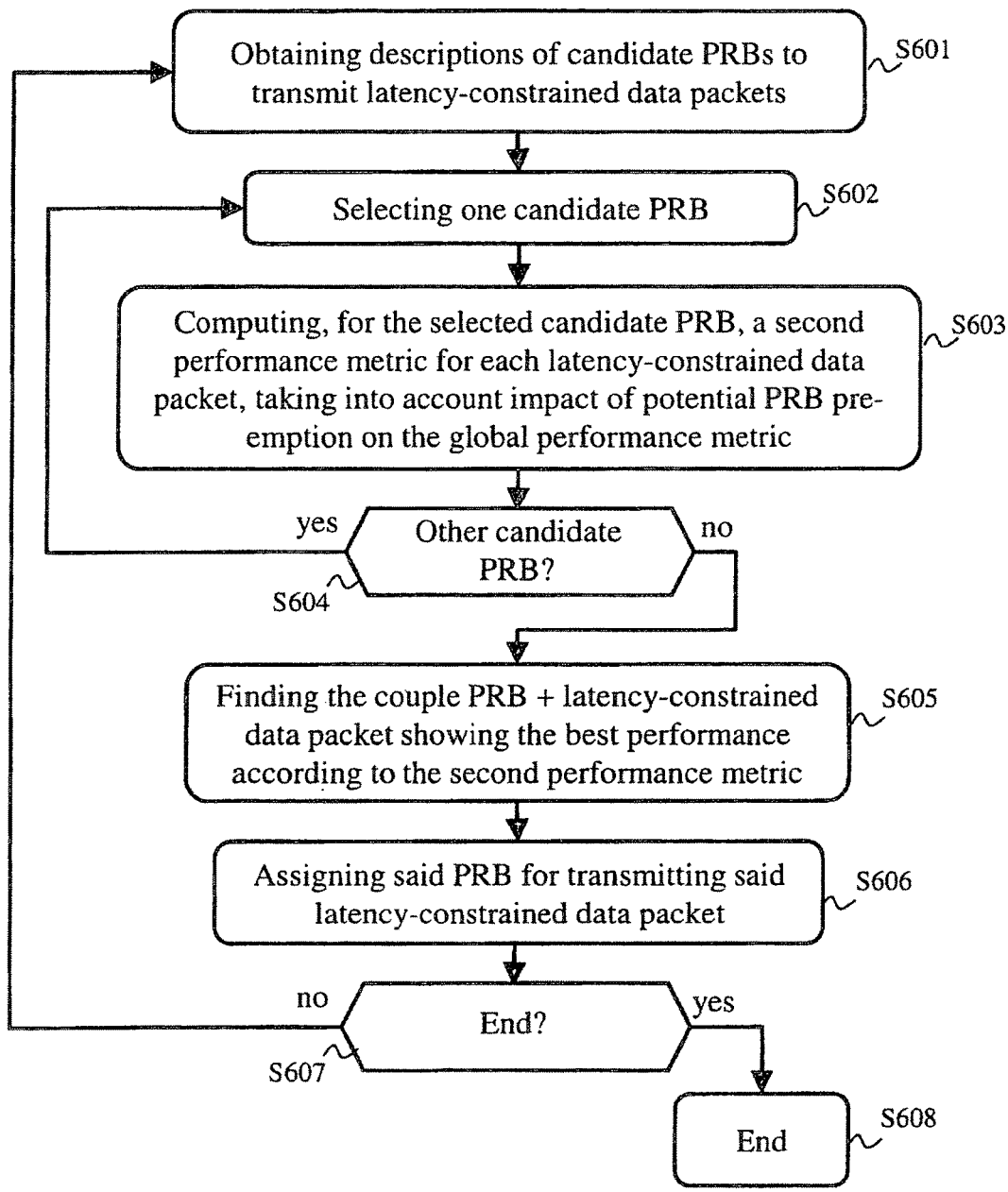
FIG. 6 schematically represents an algorithm for allocating time-frequency resources for transmitting latency-constrained data packets via the wireless communications network of FIG. 1, in a particular embodiment of the invention.

FIG. 6 schematically represents an algorithm for allocating time-frequency resources (PRBs) for transmitting latency-constrained data packets via the wireless communications network 100, in a particular embodiment of the invention.

As will be apparent in the following description, the algorithm of FIG. 6 comprises plural iterations, represented by an index q', of a loop (between steps S601 and S607). One PRB is allocated per loop to transmit latency-constrained data, as detailed hereafter. Loop iterations are preferably performed until either there is no more pending latency-constrained data to be transmitted in the considered time period $T_j$ or all PRBs of the time period $T_j$ have been allocated.

In the first occurrence of the step S601 during the execution of the algorithm of FIG. 6, the index q' is set to the value "1" and the index q' is incremented by one unit each time the step S601 is repeated (new loop iteration).

In the step S601, the scheduler device 120 obtains descriptions of candidate PRBs to transmit latency-constrained data within the considered time period $T_j$. In the first occurrence of the step S601 during the execution of the algorithm of FIG. 6, said descriptions of candidate PRBs result from the execution of the step S405. During subsequent loop iterations, the candidate PRBs evolve due to PRB allocation as detailed hereafter. The scheduler device 120 therefore considers a different set $\Omega_{q'}$ of candidate PRBs at each loop iteration.

In a following step S602, the scheduler device 120 selects one candidate PRB among the candidate PRBs, the descriptions of which having been obtained in the step S601. For instance, the selection is arbitrarily done, or done according to a predefined criterion.

In a following step S603, the scheduler device 120 computes, for the candidate PRB selected in the step S602, a second performance metric for each latency-constrained packet, as a function of the channel state information obtained in the step S402. Indeed, especially in the domain of wireless communications network, the performance of one PRB differs from one latency constrained packet to another due to different relative positions of the devices concerned by the data flow to which the data packet to be transmitted via said PRB belongs.

In a particular embodiment, the second performance metric is defined as follows:

$$\dfrac{\left(\left(\dfrac{\rho_{k'}}{(R_{k'})}\right)^{\beta-1} \dfrac{r_{k'}(i)}{(R_{k'})}\right)}{\lambda + c(i)}$$

wherein k' represents the considered latency-constrained data packet, $r_{k'}(i)$ represents the data rate achievable via the PRB i among the set $\Omega_{q'}$ for said latency-constrained data packet identified by k', according to the information representative of transmission conditions obtained in the step S402, wherein $R_{k'}$ represents the data rate achieved for said latency constrained data packet identified by k', since the beginning of its transmission, wherein β is a predefined parameter that allows to tune the prioritization of latency-constrained packets one with each other and can for example be chosen equal to "10" in order to minimize the drop rate when the amount of time-frequency resources required to send the latency-constrained data is close to the amount of available time-frequency resources of the considered time period $T_j$, $\rho_{k'}$ represents a minimum data rate for meeting the latency constraint for the latency-constrained data packet identified by k', c(i) represents a cost impact on the aforementioned global performance metric (related to the transmissions of the non latency-constrained data packets) involved by potentially pre-empting the PRB i that was previously assigned for transmitting non latency-constrained data, and λ represents a non-null constant avoiding that the divisor of the expression above be null in case there is no such pre-emption. The second performance metric as expressed above is representative of a selection criterion for optimizing the drop rate of latency-constrained data packets by taking into account the impact on the aforementioned global performance metric (related to transmissions of the non-latency constrained data packets).

In view of the global performance metric as expressed above in the scope of said particular embodiment of the first performance metric, the cost impact c(i) for pre-empting the PRB i is expressed as follows:

$$c(i) = f_\alpha(R_k) - f_\alpha(\hat{R}_k(i))$$

wherein $\hat{R}_k$ (i) is the average rate recomputed as if pre-emption of the PRB i occurs, which is for instance computed as follows:

$$\hat{R}_k(i) = R_k - \mu r_k(i)$$

wherein k represents the session to which the PRB i was previously assigned and for which the cost impact c(i) has to be determined, $R_k$ is the average rate of the session identified by k after the immediately preceding execution of the algorithm of FIG. 5.

In said particular embodiment of the second performance metric, in order to compute said second performance metric for the selected PRB i with respect to the latency-constrained data packet identified by k', the scheduler device 120 preferably performs a conversion of the latency constraint (deadline for having transmitted the corresponding data) into the minimum data rate $\rho_{k'}$ to achieve for meeting said latency constraint. The minimum data rate $\rho_{k'}$ is obtained as follows:

$$\rho_{k'} = p_{k'} / \iota_{k'}$$

wherein $p_{k'}$ represents the amount of data to be transmitted for said latency-constrained packet identified by k' under said latency constraint and $\iota_{k'}$ represents the delay before reaching the latency constraint deadline instant to be met by said latency-constrained data packet identified by k'.

In a following step S604, the scheduler device 120 checks whether there is at least one other PRB that still needs to be considered with respect to the second performance metric. When there is at least one other PRB that still needs to be considered with respect to the second performance metric, the step S602 is repeated by selecting one said PRB; otherwise, a step S605 is performed.

In the step S605, the scheduler device 120 finds, among the candidate PRBs and among the non-latency constrained packet, the couple PRB plus non-latency constrained packet that shows the best performance according to the second performance metric. Depending on the effective definition of the second performance metric, the couple PRB plus non-latency constrained packet that shows the best performance may be the one showing the highest value of the first performance metric or the one showing the lowest value of the first performance metric.

In a following step S606, the scheduler device 120 allocates the PRB of said couple for transmitting latency-constrained data related to the non-latency constrained packet of said couple. This allocation is, from now on, not supposed to be pre-empted (contrary to assignments performed with respect to non latency-constrained data packets). If pre-emption was required, the non latency-constrained data that incurred the pre-emption is put aside for a later transmission (in another time period $T_{j'}$, with j'≥j).

When the latency-constrained data packet identified by k' has been allocated the PRB i during step S606, the average data rate $R_{k'}$ is updated by considering the allocation with data rate $r_{k'}(i)$. It is considered at the beginning of the transmission of said latency-constrained data packet identified by k', the average rate $R_{k'}$ is null. Updating the average rate $R_{k'}$ for the latency-constrained data packet identified by k' which has been allocated in the step S606 a PRB providing a data rate $r_{k'}(i)$ is for example as follows for said particular embodiment of the second performance metric:

$$R_{k'} \leftarrow R_{k'} + \mu(r_{k'}(i) - R_{k'})$$

When the latency-constrained data packet identified by k' has not been allocated a PRB during the step S606, the average data rate $R_{k'}$ is updated by considering no allocation, which results in a decrease of the average data rate $R_{k'}$. Updating the average rate $R_{k'}$ for the latency-constrained packet identified by k' which has not been allocated any PRB in the step S606 is for instance as follows for said particular embodiment of the second performance metric:

$$R_{k'} \leftarrow R_{k'} - \mu R_{k'}$$

When the PRB i initially assigned to a transmission of non-latency constrained data of the session identified by k is pre-empted, the average rate $R_k$ of the session identified by k is corrected accordingly, for instance as follows for said particular embodiment of the first performance metric:

$$R_k \leftarrow R_k - \mu r_k(i)$$

Moreover, the scheduler device 120 then put aside the non latency-constrained data that incurred PRB pre-emption for a later transmission (in another time period $T_{j'}$, with j'≥j).

In the following step S607, the scheduler device 120 checks whether at least one other loop iteration remains to be performed. As already mentioned, loop iterations are preferably performed until either there is no more pending latency-constrained data to be transmitted in the considered time period $T_j$ or all PRBs of the time period $T_j$ have been allocated. Another criterion that can be used instead, or in addition, is that loop iterations be performed as far as a predefined processing timeout has not expired since the beginning of the execution of the algorithm of FIG. 6 for the considered time period $T_j$. When at least one loop iteration remains to be performed, the step S601 is repeated for a new loop iteration with an updated list of candidate PRBs, the PRB allocated in the immediately preceding occurrence of the step S606 being removed from said list of candidate PRBs; otherwise, a step S608 is performed in which the algorithm of FIG. 6 ends.

The invention claimed is:

1. A method for allocating time-frequency resources to data packets for transmitting said data packets via a communications network in which communications are performed over a frequency selective channel, the method being performed by a scheduler device of the communications network, the method comprising:

obtaining data packets to be transmitted, or descriptions thereof, each data packet being either a latency-constrained data packet or a non latency-constrained data packet; and obtaining information representative of transmission conditions for each channel available to transmit at least one obtained data packet within a predefined time period;

performing an assignment of time-frequency resources within said predefined time period for transmitting data of non latency-constrained data packets, according to the obtained information representative of transmission conditions, each of said time-frequency resources comprising a time interval within said predetermined time period for a corresponding frequency, said time intervals for the respective time-frequency resources being of a same duration;

performing a revision of the assignment so that at least one time-frequency resource previously allocated to at least one respective transmission of data of the non latency-constrained data packets is re-allocated to at least one respective transmission of data of the latency-constrained data packets instead of the data of the previously-allocated non latency-constrained data packets that incurred the assignment revision, said revision being performed by minimizing a cost impact of the revision on a global performance metric related to the transmissions of said non latency-constrained data packets; and allocating the time-frequency resources as assigned to the non latency-constrained data that did not incur the assignment revision, whereas the non latency-constrained data that incurred the assignment revision are put aside for later scheduling in a subsequent time period.

2. The method according to claim 1, wherein the non latency-constrained data packets belong to sessions that are communication contexts between two communicating items of the communications network, and in that, for performing the assignment, the scheduler device performs plural loop iterations of the following:

determining first time-frequency resource candidates of said predefined time period which has not yet been assigned and which has not yet been allocated;

for each first time-frequency resource candidate: determining, for each session, a first performance metric, according to the obtained information representative of the transmission conditions;

finding a combination of first time-frequency resource candidate and session showing the best performance according to the first performance metric; and assigning the time-frequency resource candidate of said combination for transmitting non latency-constrained data of the session of said combination.

3. The method according to claim 2, wherein, for performing the revision of the assignment and the allocation of time-frequency resources for transmitting the data of the latency-constrained data packets, the scheduler device performs plural loop iterations of the following:

determining second time-frequency resource candidates of said predefined time period which has not yet been allocated;

for each second time-frequency resource candidate: determining, for each non latency-constrained data packet, a second performance metric, according to the obtained information representative of the transmission conditions;

finding a combination of second time-frequency resource candidate and non latency-constrained data packet showing the best performance according to the second performance metric under a constraint of minimizing the cost impact, on said global performance metric, of pre-empting of the time-frequency resource when previously assigned for transmitting non latency-constrained data; and allocating the time-frequency resource candidate of said couple for transmitting data of the latency-constrained data packet of said couple.

4. The method according to claim 3, wherein the first performance metric is defined, for the selected time-frequency resource candidate i, as follows:

$$\frac{r_k(i)}{(R_k)^\alpha}$$

wherein k represents the considered session, $r_k(i)$ represents a data rate achievable via the time-frequency resource candidate i for said session according to the obtained information representative of transmission conditions, $R_k$ represents a data rate achieved for said session since the beginning of its non-latency constrained data transfer in the execution of the loop iterations and α is a predefined integer parameter such that α≥0.

5. The method according to claim 4, wherein said global performance metric is defined as follows:

$$\sum_k f_\alpha(R_k)$$

wherein $R_k$ is the average rate of the session identified by k after the execution of the loop iterations for said predefined time period and wherein $f_\alpha$ is a utility function that depends on the predefined parameter α and that is defined as follows:

$$\begin{cases} f_\alpha(x) = \frac{x^{1-\alpha}}{1-\alpha}, \alpha \geq 0, \alpha \neq 1 \\ f_\alpha(x) = \log(x), \alpha = 1 \\ f'_\alpha(x) = x^{-\alpha} \end{cases}$$

wherein $f'_\alpha$ is the derivative function of the utility function $f_\alpha$.

6. The method according to claim 5, wherein the second performance metric is defined, for the selected time-frequency resource candidate i, as follows:

$$\frac{\left(\left(\frac{\rho_{k'}}{(R_{k'})}\right)^{\beta-1}\frac{r_{k'}(i)}{(R_{k'})}\right)}{\lambda + c(i)}$$

wherein k' represents the considered latency-constrained data packet, $r_{k'}(i)$ represents the data rate achievable via the time-frequency resource candidate i for said latency-constrained data packet according to the obtained information representative of transmission conditions, $R_{k'}$ represents the data rate achieved for said latency constrained data packet since the beginning of its transmission, β is a predefined parameter, $\rho_{k'}$ represents a minimum data rate for meeting the latency constraint for said latency-constrained data packet, c(i) represents the cost impact on said global performance metric involved by potentially pre-empting the time-frequency resource candidate i when previously assigned for transmitting non latency-constrained data, and λ represents a non-null constant.

7. The method according to claim 6, wherein the cost impact c(i) is expressed as follows:

$$c(i) = f_\alpha(R_k) - f_\alpha(\hat{R}_k(i))$$

wherein $\hat{R}_k(i)$ is the average rate recomputed for the session represented by k as if pre-emption of the time-frequency resource candidate i occurs.

8. The method according to claim 6, further comprising performing, for each latency-constrained data packet k', a conversion of the latency constraint to be met by said latency-constrained data packet into the minimum data rate $\rho_{k'}$ as follows:

$$\rho_{k'} = P_{k'}/l_{k'}$$

wherein $P_{k'}$ represents the amount of data to be transmitted for said latency-constrained packet under said latency constraint and $l_{k'}$ represents a delay before reaching the latency constraint deadline instant to be met by said latency-constrained data packet.

9. The method according to claim 7, wherein $\hat{R}_k(i)$ is defined as follows:

$$\hat{R}_k(i)=R_k-\mu r_k(i)$$

wherein μ is a predefined forgetting factor such that $0<\mu<1$.

10. The method according to claim 7, further comprising performing, for each latency-constrained data packet k', a conversion of the latency constraint to be met by said latency-constrained data packet into the minimum data rate $\rho_{k'}$ as follows:

$$\rho_{k'}=P_{k'}/l_{k'}$$

wherein $P_{k'}$ represents the amount of data to be transmitted for said latency-constrained packet under said latency constraint and $l_{k'}$ represents a delay before reaching the latency constraint deadline instant to be met by said latency-constrained data packet.

11. The method according to claim 9, further comprising performing, for each latency-constrained data packet k', a conversion of the latency constraint to be met by said latency-constrained data packet into the minimum data rate $\rho_{k'}$ as follows:

$$\rho_{k'}=P_{k'}/l_{k'}$$

wherein $P_{k'}$ represents the amount of data to be transmitted for said latency-constrained packet under said latency constraint and $l_{k'}$ represents a delay before reaching the latency constraint deadline instant to be met by said latency-constrained data packet.

12. A non-transitory computer-readable storage medium on which is stored a computer program comprising program code instructions which, when executed by a computer processor, performs a process including:
  obtaining data packets to be transmitted, or descriptions thereof, each data packet being either a latency-constrained data packet or a non latency-constrained data packet; and
  obtaining information representative of transmission conditions for each channel available to transmit at least one obtained data packet within a predefined time period;
  performing an assignment of time-frequency resources within said predefined time period for transmitting data of non latency-constrained data packets, according to the obtained information representative of transmission conditions, each of said time-frequency resources comprising a time interval within said predetermined time period for a corresponding frequency, said time intervals for the respective time-frequency resources being of a same duration;
  performing a revision of the assignment so that at least one time-frequency resource previously allocated to at least one respective transmission of data of the non latency-constrained data packets is re-allocated to at least one respective transmission of data of the latency-constrained data packets instead of the previously-allocated data of the non latency-constrained data packets that incurred the assignment revision, said revision being performed by minimizing a cost impact of the revision on a global performance metric related to the transmissions of said non latency-constrained data packets; and
  allocating the time-frequency resources as assigned to the non latency-constrained data that did not incur the assignment revision, whereas the non latency-constrained data that incurred the assignment revision are put aside for later scheduling in a subsequent time period.

13. A scheduler device for allocating time-frequency resources to data packets for transmitting said data packets via a communications network in which communications are performed over a frequency selective channel, the scheduler device comprising:
  a computer processor, and
  a memory comprising instructions which, when executed by the computer processor, performs a process including
  obtaining data packets to be transmitted, or descriptions thereof, each data packet being either a latency-constrained data packet or a non latency-constrained data packet; and
  obtaining information representative of transmission conditions for each channel available to transmit at least one obtained data packet within a predefined time period;
  performing an assignment of time-frequency resources within said predefined time period for transmitting data of non latency-constrained data packets, according to the obtained information representative of transmission conditions, each of said time-frequency resources comprising a time interval within said predetermined time period for a corresponding frequency, said time intervals for the respective time-frequency resources being of a same duration;
  performing a revision of the assignment so that at least one time-frequency resource previously allocated to at least one respective transmission of data of the non latency-constrained data packets is re-allocated to at least one respective transmission of data of the latency-constrained data packets instead of the previously-allocated data of the non latency-constrained data packets that incurred the assignment revision, said revision being performed by minimizing a cost impact of the revision on a global performance metric related to the transmissions of said non latency-constrained data packets; and
  allocating the time-frequency resources as assigned to the non latency-constrained data that did not incur the assignment revision, whereas the non latency-constrained data that incurred the assignment revision are put aside for later scheduling in a subsequent time period.

* * * * *